United States Patent
Han et al.

(10) Patent No.: US 12,027,913 B2
(45) Date of Patent: Jul. 2, 2024

(54) POWER CONVERSION DEVICE

(71) Applicant: LS ELECTRIC CO., LTD., Anyang-si (KR)

(72) Inventors: Tae Hee Han, Anyang-si (KR); Ji Hong Kim, Anyang-si (KR); Ji Heon Lee, Anyang-si (KR); Hee Jung Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 18/014,303

(22) PCT Filed: Jun. 30, 2021

(86) PCT No.: PCT/KR2021/008272
§ 371 (c)(1),
(2) Date: Jan. 3, 2023

(87) PCT Pub. No.: WO2022/005205
PCT Pub. Date: Jan. 6, 2022

(65) Prior Publication Data
US 2023/0352969 A1    Nov. 2, 2023

(30) Foreign Application Priority Data

Jul. 3, 2020 (KR) .................. 10-2020-0081981

(51) Int. Cl.
*H02M 3/335* (2006.01)
*H02J 9/06* (2006.01)
(Continued)

(52) U.S. Cl.
CPC .......... *H02J 9/062* (2013.01); *H02M 1/0054* (2021.05); *H02M 1/0077* (2021.05); *H02M 7/219* (2013.01)

(58) Field of Classification Search
CPC ...... H02J 9/062; H02M 7/219; H02M 1/0077; H02M 1/0054
See application file for complete search history.

(56) References Cited

U.S. PATENT DOCUMENTS

2012/0218785 A1* 8/2012 Li ..................... H02M 7/487
363/21.12
2012/0287690 A1* 11/2012 Paatero ............. H02M 7/487
363/134
(Continued)

FOREIGN PATENT DOCUMENTS

EP    2779345 A1    9/2014
JP    2006042427 A    2/2006
(Continued)

OTHER PUBLICATIONS

International Search Report for related International Application No. PCT/KR2021/008272; report dated Jan. 6, 2022; (5 pages).
(Continued)

*Primary Examiner* — Jared Fureman
*Assistant Examiner* — Esayas G Yeshaw
(74) *Attorney, Agent, or Firm* — K&L Gates LLP

(57) ABSTRACT

A power conversion device for controlling a DC voltage of a DC link may comprise a first diode, a second diode, a first switching element, a second switching element, a third switching element, and a fourth switching element, wherein: a cathode terminal of the first diode is connected to a positive terminal of the DC link; an anode terminal of the first diode is connected to one end of the first switching element and one end of the third switching element; the other end of the first switching element is connected to an alternating current terminal and one end of the second switching element; the other end of the second switching element is connected to one end of the second diode and one
(Continued)

end of the fourth switching element; the other end of the second diode is connected to a negative terminal of the DC link.

18 Claims, 14 Drawing Sheets

(51) Int. Cl.
*H02M 1/00* (2006.01)
*H02M 7/219* (2006.01)

(56) References Cited

U.S. PATENT DOCUMENTS

| | | | |
|---|---|---|---|
| 2013/0049699 A1* | 2/2013 | Jayaraman | H02M 1/10 320/137 |
| 2018/0097453 A1* | 4/2018 | Xu | H02P 27/06 |
| 2023/0092047 A1* | 3/2023 | Zhang | H02J 9/062 307/66 |

FOREIGN PATENT DOCUMENTS

| | | |
|---|---|---|
| JP | 2013211970 A | 10/2013 |
| JP | 2018014880 A | 1/2018 |
| KR | 101366393 B1 | 2/2014 |
| KR | 20140013863 A | 2/2014 |
| KR | 20160100346 A | 8/2016 |
| KR | 101729146 B1 | 4/2017 |
| KR | 20190034861 A | 4/2019 |
| WO | 2014024321 A1 | 2/2014 |

OTHER PUBLICATIONS

Written Opinion for related International Application No. PCT/KR2021/008272; report dated Jan. 6, 2022; (6 pages).
Zhang, et al.; "Loss Distribution Analysis of Three-Level Active Neutral-Point-Clamped (3L-ANPC) Converter with Different PWM Strategies"; IEEE; 2016; (6 pages).
Office Action for related Japanese Application No. 2023-500100; action dated Apr. 16, 2024; (4 pages).

\* cited by examiner

|  | CASE1 | CASE2 | CASE3 | CASE4 |
|---|---|---|---|---|
| IL | -IL | -IL | +IL | +IL |
| SW1 | ON | OFF | OFF | OFF |
| SW2 | ON | ON | OFF | ON |
| SW3 | OFF | ON | ON | ON |
| SW4 | OFF | OFF | ON | OFF |
| SW5 | OFF | ON | ON | ON |
| SW6 | ON | ON | OFF | ON |
| Ip | -I | 0 | 0 | 0 |
| Io | 0 | -I | 0 | +I |
| In | 0 | 0 | +I | 0 |
| Current direction | Charging | Charging | Charging | Charging |

POWER CONVERSION DEVICE

CROSS-REFERENCE TO RELATED APPLICATIONS

This application is the National Stage filing under 35 U.S.C. 371 of International Application No. PCT/KR2021/008272, filed on Jun. 30, 2021, which claims the benefit of earlier filing date and right of priority to Korea utility model Application No. 10-2020-0081981 filed on Jul. 3, 2020, the contents of which are all hereby incorporated by reference herein in their entirety.

FIELD

The present disclosure relates to a power conversion device. More specifically, the present disclosure relates to a power conversion device used in an uninterruptible power supply (UPS).

BACKGROUND

An uninterruptible power supply (UPS) is an energy protection device that prevents a load system from being affected by interruption of an external power system for a certain period of time.

That is, the uninterruptible power supply may supply power to the load using energy stored in a battery during a power outage.

The uninterruptible power supply includes a power conversion device that converts AC power received from an AC source to DC power or converts DC power to AC power.

The power conversion device may include a plurality of switching elements and perform power conversion via controlling a switching frequency of each of the switching elements.

The power conversion device used in the uninterruptible power supply usually includes multiple switching elements. However, according to the prior art, when the power conversion device operates in a specific mode, for example, a mode for converting AC power to DC power, some switching elements are not switched. Therefore, there is a problem in that unnecessary switching loss occurs and a manufacturing cost of the power conversion device increases.

SUMMARY

A purpose of the present disclosure is to simplify a configuration of a power conversion device used in an uninterruptible power supply that converts AC power to DC power.

Further, a purpose of the present disclosure is to replace some switching elements included in a power conversion device used in an uninterruptible power supply that converts AC power to DC power with a circuit having a simple configuration.

A power conversion device for controlling a DC voltage of a DC link according to an embodiment of the present disclosure may include a first diode; a second diode; a first switching element; a second switching element; a third switching element; and a fourth switching element, wherein a cathode terminal of the first diode may be connected to a positive terminal of the DC link, and an anode terminal of the first diode may be connected to one end of the first switching element and one end of the third switching element, wherein the other end of the first switching element may be connected to an AC terminal and one end of the second switching element; wherein the other end of the second switching element may be connected to one end of the second diode and one end of the fourth switching element; wherein the other end of the second diode may be connected to a negative terminal of the DC link, wherein the other end of the third switching element may be connected to the other end of the fourth switching element and a neutral point of the DC link.

Each of the first to fourth switching elements may include an insulated gate bipolar transistor (IGBT), and an anti-parallel diode connected in anti-parallel to the IGBT.

The power conversion device may further include a gate driver for controlling an on or off state of each of the first to fourth switching elements.

The gate driver may be configured to apply an on-signal to each of the first switching element and the fourth switching element, and apply an off-signal to each of the second switching element and the third switching element such that current output from the AC terminal flows through the diode included in the first switching element and the first diode and then to the positive terminal of the DC link.

The gate driver may be configured to apply an on-signal to each of the first to fourth switching elements such that one half of current output from the AC terminal flows through the diode of the first switching element and the IGBT of the third switching element and then to the neutral point of the DC link, while the other half of the current output from the AC terminal flows through the IGBT of the second switching element and the diode of the fourth switching element and then to the neutral point of the DC link.

The gate driver may be configured to apply an off-signal to each of the first switching element and the fourth switching element, and apply an on-signal to each of the second switching element and the third switching element such that current output from the negative terminal of the DC link flows through the second diode and the diode of the second switching element and then to the AC terminal.

The gate driver may be configured to apply an on-signal to each of the first to fourth switching elements such that one half of current output from the neutral point of the DC link flows through the diode of the second switching element and the IGBT of the first switching element, and then to the AC terminal, while the other half of the current output from the neutral point of the DC link flows through the IGBT of the fourth switching element and the diode of the second switching element and then to the AC terminal.

The power conversion device may be included in an uninterruptible power supply (UPS), wherein the power conversion device may be an ANPC (Active Neutral Point Clamped)-type converter for converting AC power to DC power.

The power conversion device may further include a first capacitor disposed between the positive terminal and the neutral point of the DC link; and a second capacitor disposed between the neutral point and the negative terminal of the DC link.

Each of the first to fourth switching elements may include a metal oxide semiconductor field effect transistor (MOSFET), and an anti-parallel diode connected in anti-parallel to the MOSFET.

A power conversion device for controlling a DC voltage of a DC link according to another embodiment of the present disclosure may include a first diode; a second diode; a first switching element; a second switching element; a third switching element; and a fourth switching element, wherein each of the first to fourth switching elements may include an insulated gate bipolar transistor (IGBT), and an anti-parallel diode connected in anti-parallel to the IGBT, wherein a cathode terminal of the first diode may be connected to a positive terminal of the DC link, wherein an anode terminal of the first diode may be connected to a collector terminal of the first switching element and a collector terminal of the third switching element, wherein an emitter terminal of the first switching element may be connected to an AC terminal and a collector terminal of the second switching element, wherein an emitter terminal of the second switching element may be connected to a cathode terminal of the second diode and an emitter terminal of the fourth switching element, wherein an anode terminal of the second diode may be connected to a negative terminal of the DC link, wherein an emitter terminal of the third switching element may be connected to a collector terminal of the fourth switching element and a neutral point of the DC link.

According to various embodiments of the present disclosure, in an ANPC-type power conversion device used in an uninterruptible power supply, two switching elements are replaced with two diodes such that a circuit configuration of the power conversion device can be simplified.

Accordingly, switching loss of the power conversion device is reduced, and a manufacturing cost of the power conversion device is greatly reduced.

DETAILED DESCRIPTION

Figure 1:
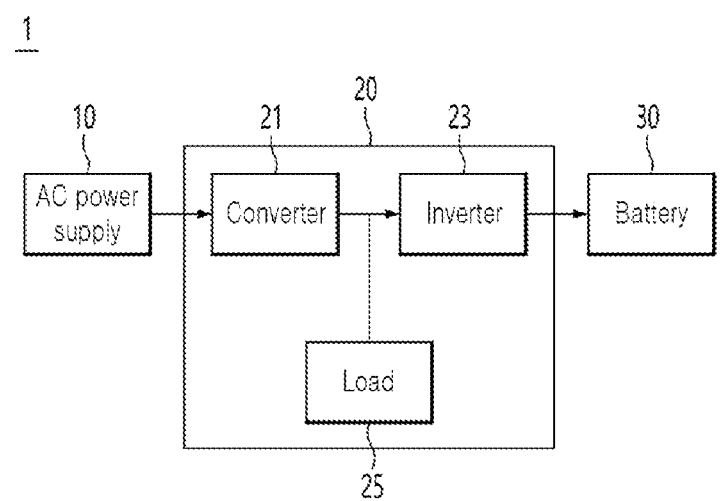
FIG. 1 is a block diagram showing a configuration of a power system according to an embodiment of the present disclosure.

The above purposes, features and advantages will be described in detail with reference to the accompanying drawings, and accordingly, those skilled in the art will be able to easily implement the embodiments of the present disclosure. In describing the present disclosure, when it is determined that a detailed description of a known component related to the present disclosure may unnecessarily obscure gist of the present disclosure, the detailed description will be omitted. Hereinafter, preferred embodiments of the present disclosure will be described in detail with reference to the accompanying drawings. In the drawings, like reference numerals indicate the same or similar elements. The suffixes "module" and "unit" for each of components used in the following description are given or used interchangeably in consideration of ease of writing the present disclosure, and do not have meanings or roles that are distinct from each other by themselves.

FIG. 1 is a block diagram showing a configuration of a power system according to an embodiment of the present disclosure.

Referring to FIG. 1, a power system 1 may include an AC power supply 10, an uninterruptible power supply 20 and a load 30.

The AC power supply 10 may supply AC power to the uninterruptible power supply.

The uninterruptible power supply 20 may deliver AC power supplied from the AC power supply 10 to the load 30.

The uninterruptible power supply 20 may include a converter 21, an inverter 23 and a battery 25.

The converter 21 may convert AC power received from the AC power supply 10 into DC power. The converter 21 may transfer the converted DC power to the inverter 23.

The converter 21 may charge a portion of the converted DC power to the battery 25.

The inverter 23 may convert the DC power received from the converter 21 into AC power, and may supply the converted AC power to the load 30.

The uninterruptible power supply 20 may further include a bypass converter (not shown) located between the AC power supply 10 and the load 30.

The uninterruptible power supply 20 may supply energy to the load 30 via the bypass converter in an event of a power outage. The uninterruptible power supply 20 may supply power to the load 30 via the bypass converter when the inverter 23 cannot supply power to the load 30 due to power failure.

The uninterruptible power supply 20 may stably supply power to the load 30 even during a power outage.

The load 30 may receive the AC power from the uninterruptible power supply 20 and operate according to the received AC power.

Figure 2:
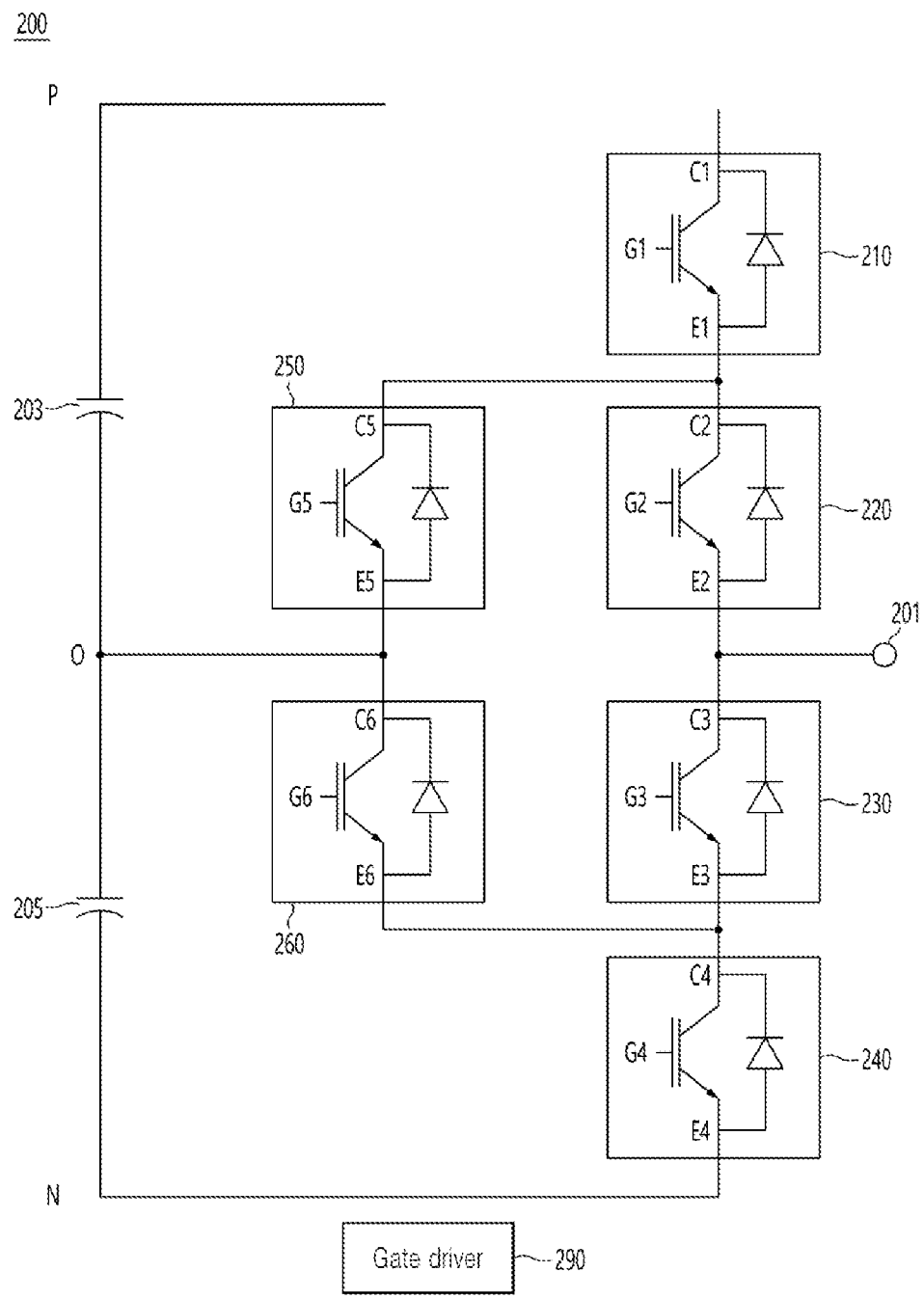
FIG. 2 is a circuit diagram of a first power conversion device according to an embodiment of the present disclosure.

FIG. 2 is a circuit diagram of a first power conversion device according to an embodiment of the present disclosure.

A power conversion device 200 as shown in FIG. 2 is an example of the converter 21 included in the uninterruptible power supply 20 of FIG. 1.

The power conversion device 200 may be an ANPC (Active Neutral Point Clamped)-type converter.

The ANPC (Active Neutral Point Clamped) type may be one of types representing a connection relationship between switching elements.

The power conversion device 200 according to an embodiment of FIG. 2 may convert AC power to DC power.

The power conversion device 200 may include first to sixth switching elements 210 to 260, a first capacitor 203, a second capacitor 205, and a gate driver 290.

Each of the first to sixth switching elements 210 to 260 may include an insulated gate bipolar transistor (IGBT), and an anti-parallel diode connected in anti-parallel to the IGBT.

Each of the first capacitor 203 and the second capacitor 205 may convert pulsating current into direct current while converting AC power into DC power. That is, each of the first capacitor 203 and the second capacitor 205 may be an example of a smoothing circuit.

The gate driver 290 may control an operation of each of the first to sixth switching elements 210 to 260.

The gate driver 290 may apply an on-signal or an off-signal to each of the first to sixth switching elements 210 to 260 to control a switching operation thereof.

The gate driver 290 may apply a pulse width modulation (PWM) signal to control a switching operation of each of the first to sixth switching elements 210 to 260.

The gate driver 290 may apply the PWM signal to a gate terminal of each of the first to sixth switching elements 210 to 260.

A collector terminal C1 of the first switching element 210 is connected to a positive terminal P of a DC link. An emitter terminal E1 of the first switching element 210 is connected to a collector terminal C2 of the second switching element 220 and a collector terminal C5 of the fifth switching element 250.

An emitter terminal E2 of the second switching element 220 is connected to an AC terminal 201 and a collector terminal C3 of the third switching element 230.

An emitter terminal E5 of the fifth switching element 250 is connected to a neutral point O of the DC link and to a collector terminal C6 of the sixth switching element 260.

The neutral point O of the DC link is connected to one end of the first capacitor 203 and one end of the second capacitor 205.

The other end of the first capacitor 203 is connected to the positive terminal P of the DC link.

The other end of the second capacitor 205 is connected to a negative terminal N of the DC link.

A collector terminal C6 of the sixth switching element 260 is connected to an emitter terminal 230 of the third switching element 230 and a collector terminal C4 of the fourth switching element 240.

An emitter terminal E4 of the fourth switching element 240 is connected to the negative terminal N of the DC link.

The ANPC-type power conversion device 200 according to an embodiment of FIG. 2 uses a high frequency switching scheme for applying a high frequency signal to the second switching element 220 and the third switching element 230, and a low frequency switching scheme for applying a low frequency signal to the first switching element 210, the fifth switching element 250, the sixth switching element 260 and the fourth switching element 240.

In another example, the ANPC-type power conversion device 200 uses a low-frequency switching scheme for applying a low-frequency signal to the second switching element 220 and the third switching element 230, and a high frequency switching scheme for applying a high frequency signal to the first switching element 210, the fifth switching element 250, the sixth switching element 260 and the fourth switching element 240.

FIG. 3 to FIG. 6 are diagrams illustrating a direction of current flowing in the power conversion device when controlling a DC voltage of the DC link via the power conversion device according to an embodiment of the present disclosure.

Hereinafter, an embodiment of FIG. 3 to FIG. 6 is described based on the power conversion device 200 of FIG. 2.

In FIG. 3 to FIG. 6, the power conversion device 200 may be the ANPC-type device that is included in the uninterruptible power supply and converts AC power provided from a system into DC power.

Further, FIG. 3 to FIG. 6 are diagrams illustrating the direction of the current flowing in the power conversion device 200 when the power conversion device 200 converts AC power to DC power.

Figure 3:
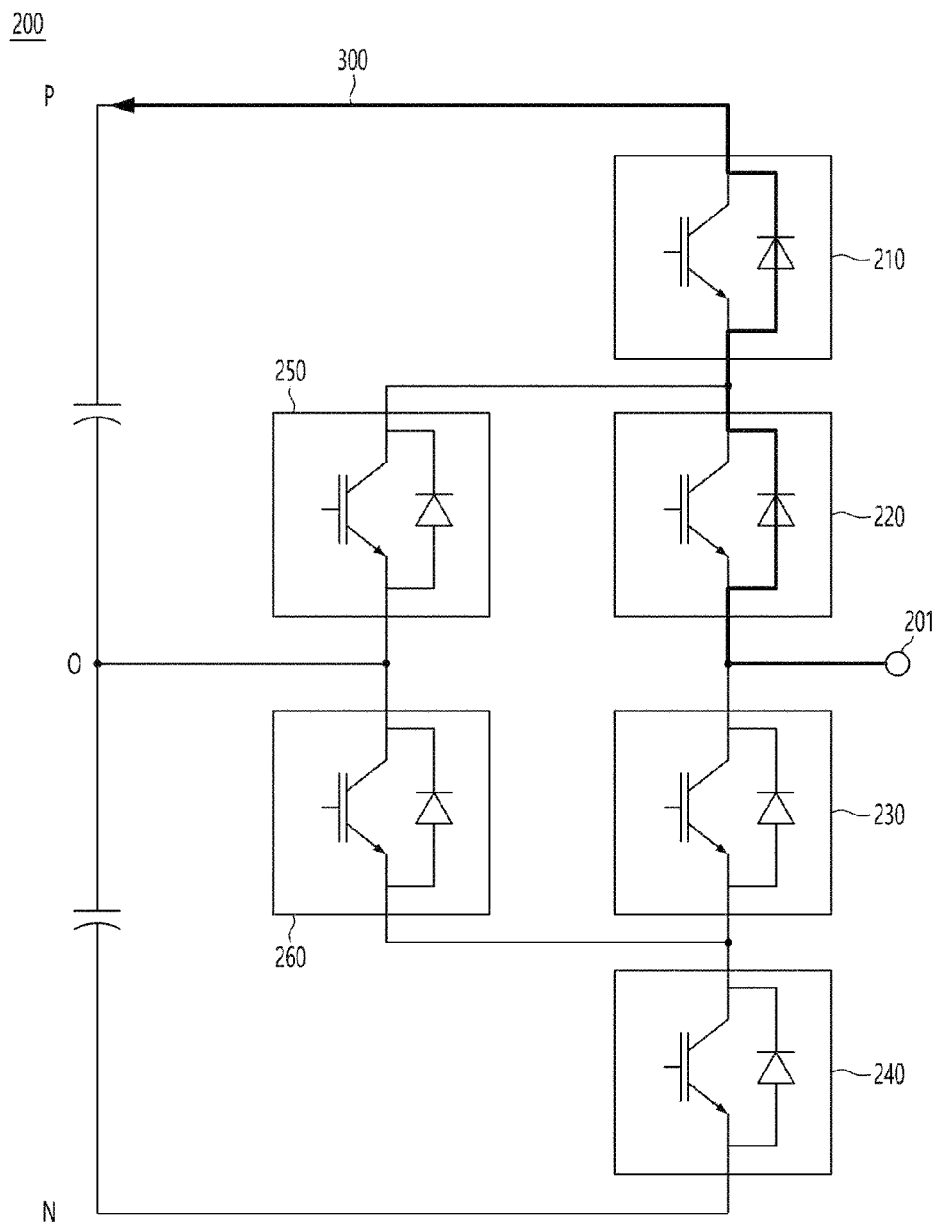
FIG. 3 to FIG. 6 are diagrams illustrating a direction of current flowing in a power conversion device when controlling a DC voltage of a DC link via the power conversion device according to an embodiment of the present disclosure.

First, FIG. 3 is described.

In FIG. 3, it is assumed that each of the first switching element 210, the second switching element 220, and the sixth switching element 260 is in an on state, while each of the third switching element 230, the fourth switching element 240, and the fifth switching element 250 is in an off state.

In this case, current 300 from the AC terminal 301 flows through a diode of the second switching element 220 and a diode of the first switching element 210, and then flows to the positive terminal P of the DC link.

Figure 4:
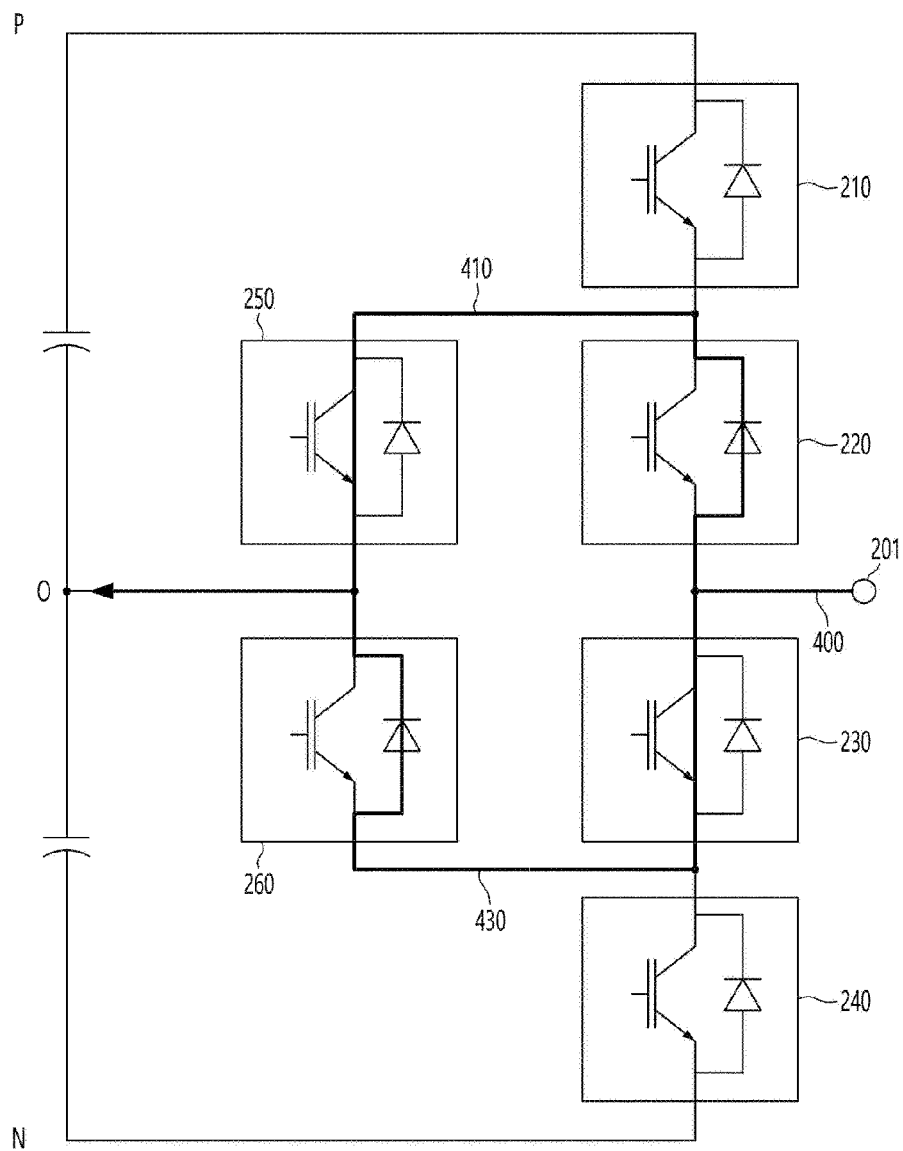

Next, FIG. 4 is described.

In FIG. 4, the second switching element 220, the third switching element 230, the fifth switching element 250, and the sixth switching element 260 are in an on state, while the first switching element 210 and the fourth switching element 240 are in an off state.

In this case, one half 410 of current 400 output from the AC terminal 301 flows through a diode of the second switching element 220 and an IGBT of the fifth switching element 250, and flows to the neutral point O of the DC link.

Further, the other half 430 of the current 400 output from the AC terminal 301 flows through an IGBT of the third switching element 230 and a diode of the sixth switching element 260, and flows to the neutral point O of the DC link.

Figure 5:
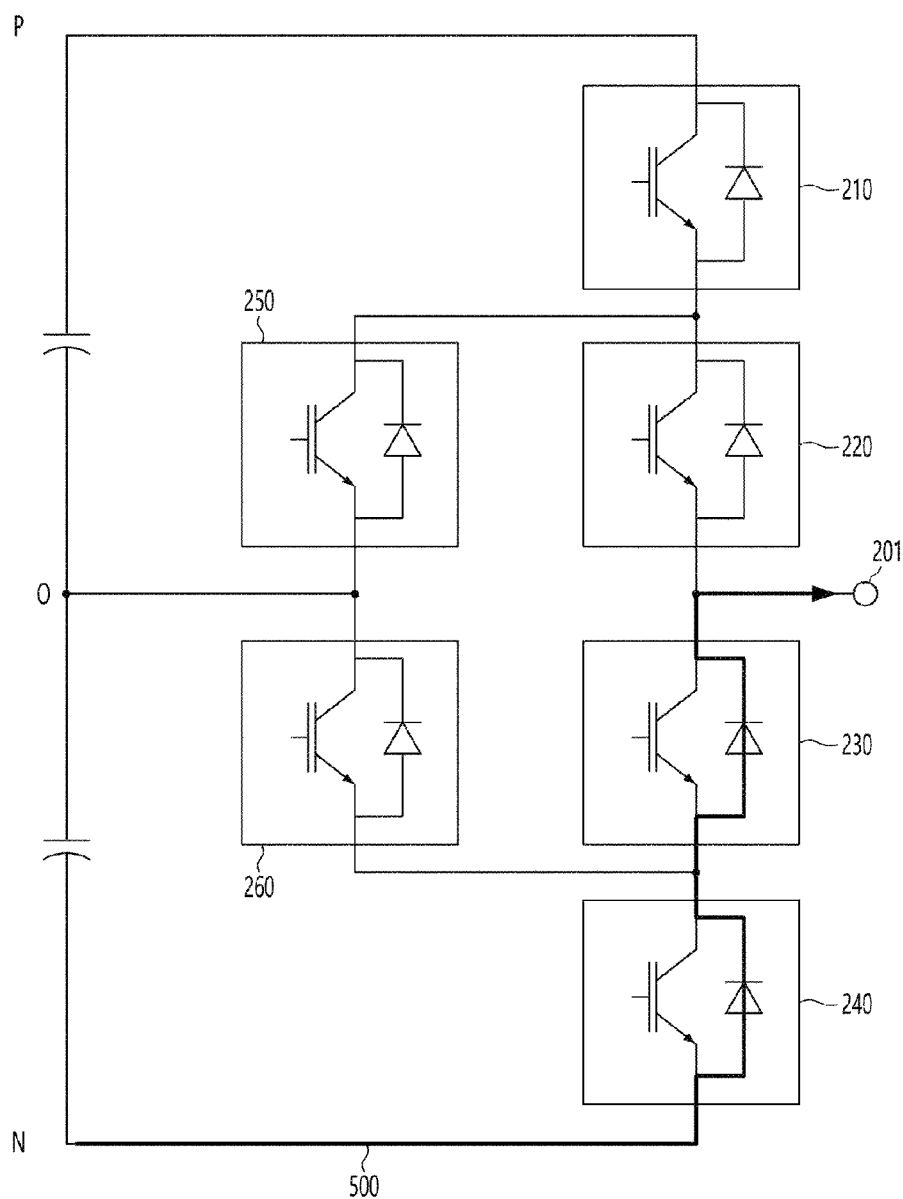

Next, FIG. 5 is described.

In FIG. 5, each of the first switching element 210, the second switching element 220, and the sixth switching element 260 is in an off state, while each of the third switching element 230, the fourth switching element 240 and the fifth switching element 250 is in an on state.

In this case, current 500 output from the negative terminal N of the DC link flows through a diode of the fourth switching element 240 and a diode of the third switching element 230, and flows to the AC terminal 201.

Figure 6:
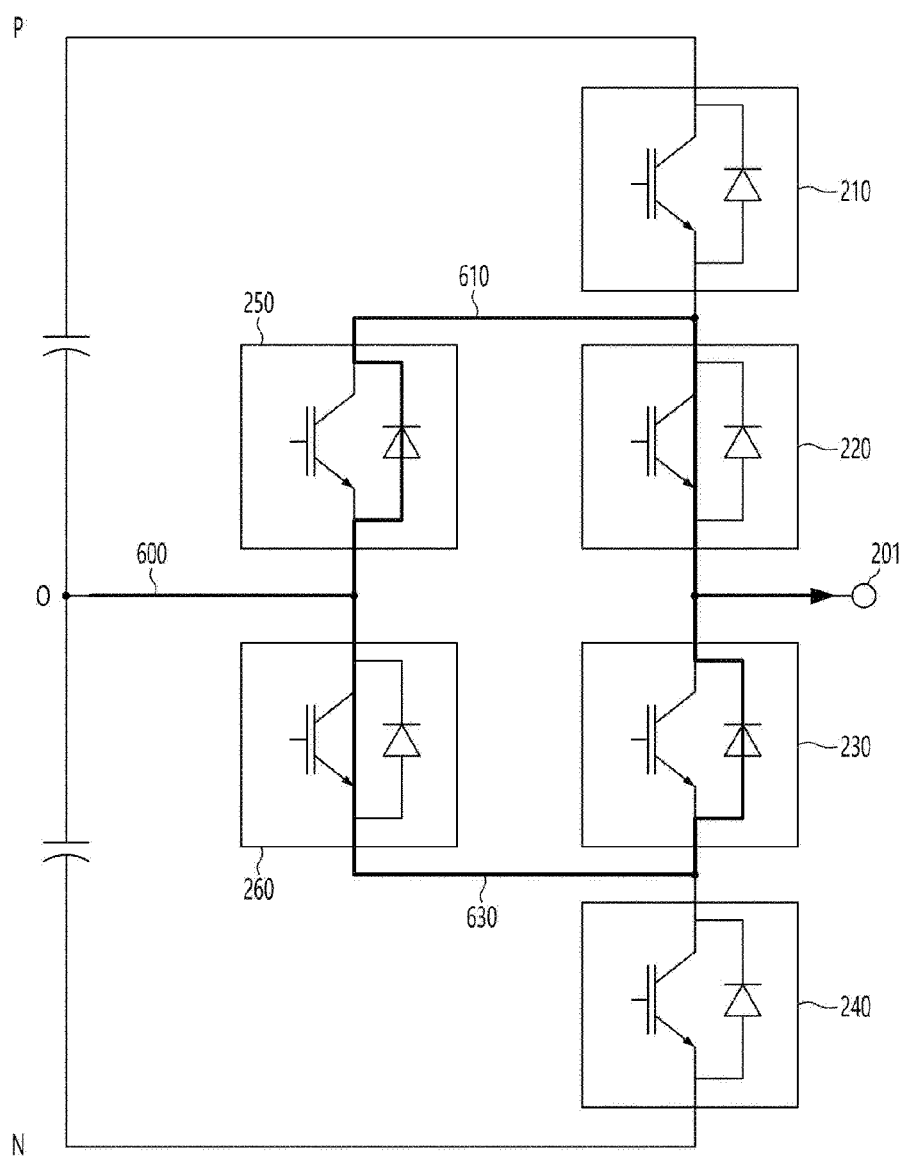

Next, FIG. 6 is described.

In FIG. 6, each of the first switching element 210 and the fourth switching element 240 is in an off state, while each of the second switching element 220, the third switching element 230, the fifth switching element 250 and the sixth switching element 260 is in an on state.

In this case, one half 610 of current 600 output from the neutral point O of the DC link flows through a diode of the fifth switching element 250 and an IGBT of the second switching element 220 and then to the AC terminal 201.

The other half 630 of the current 600 output from the neutral point O of the DC link flows through an IGBT of the sixth switching element 260 and a diode of the third switching element 220 and then to the AC terminal 201.

When the ANPC-type power conversion device 200 converts DC power into AC power, both the first switching element 210 and the fourth switching element 240 perform a switching operation.

On the contrary, when the ANPC-type power conversion device 200 converts AC power to DC power, each of the first switching element 210 and the fourth switching element 240 simply acts as a diode in order to control a DC link voltage.

That is, when the ANPC-type power conversion device 200 is used in the uninterruptible power supply, each of the first switching element 210 and the fourth switching element 240 only functions as a diode. Therefore, expensive devices such as IGBTs do not need to be used.

Hereinafter, a method of replacing a switching element that does not perform a switching operation with a diode when the ANPC-type power conversion device is used as a converter of the uninterruptible power supply is provided.

Figure 7:
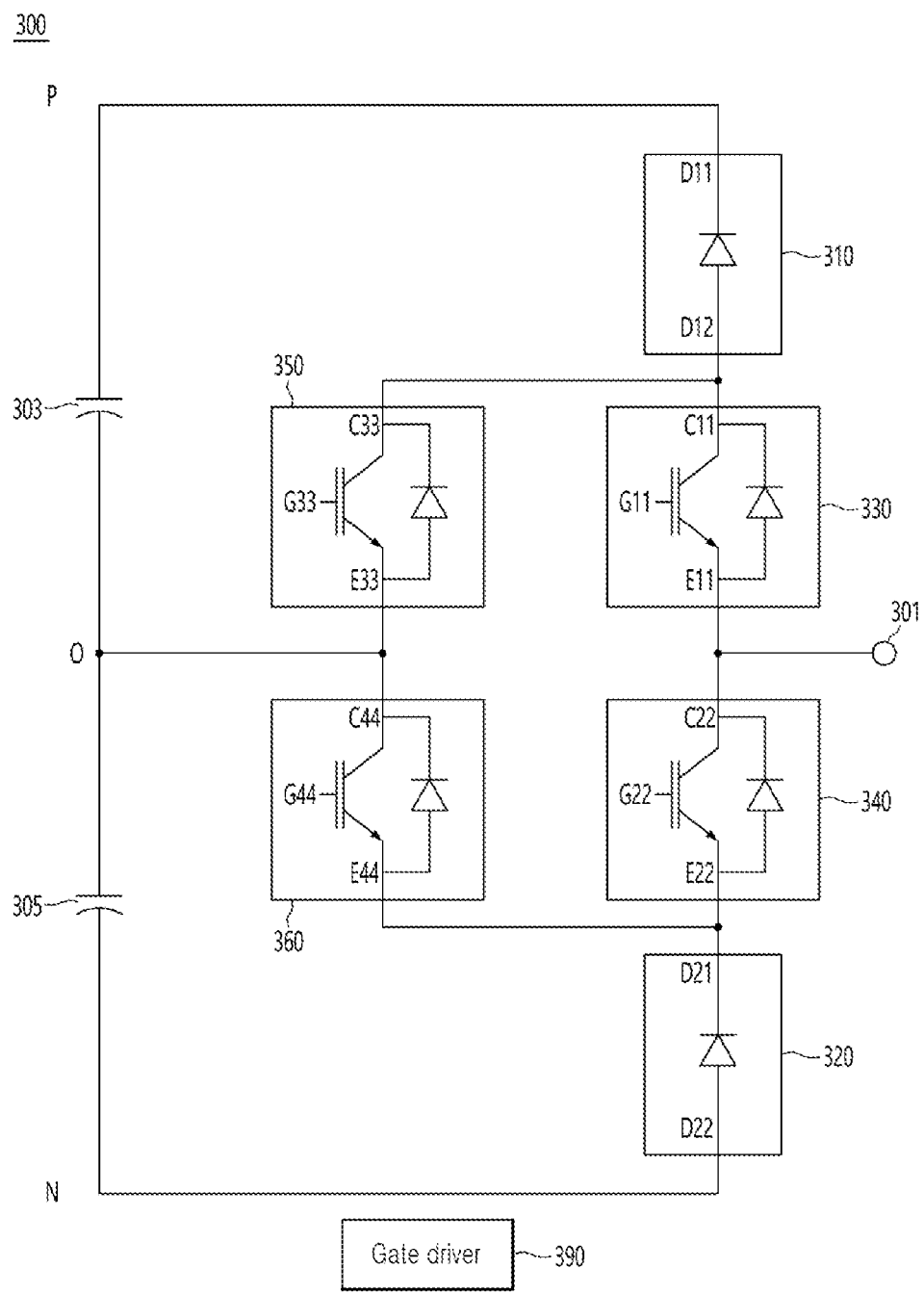
FIG. 7 is a circuit diagram of a power conversion device according to another embodiment of the present disclosure.

FIG. 7 is a circuit diagram of a power conversion device according to another embodiment of the present disclosure.

A power conversion device 300 is an example of the converter 21 of the uninterruptible power supply 20 as shown in FIG. 1, and may be of the ANPC type.

The power conversion device 300 may include a first diode 310, a second diode 320, first to fourth switching elements 330 to 360, a first capacitor 303, and a second capacitor 305.

The power conversion device 300 may further include a gate driver 390 for controlling an operation of each of the first to fourth switching elements 330 to 360.

The power conversion device 300 according to an embodiment of FIG. 7 and the power conversion device 200 according to an embodiment of FIG. 2 are compared with each other.

In FIG. 7, the first switching element 210 among the components of the power conversion device 200 of FIG. 2 is replaced with the first diode 310. The fourth switching element 240 among the components of the power conversion device 200 of FIG. 2 is replaced with the second diode 320.

Each of the first to fourth switching elements 330 to 360 may be embodied as an insulated gate bipolar transistor (IGBT). However, this is only an example.

That is, each of the first to fourth switching elements 330 to 360 may be embodied as a metal oxide semiconductor field effect transistor (MOSFET).

In this case, each of the first to fourth switching elements 330 to 360 may include a MOSFET and an anti-parallel diode connected in anti-parallel to the MOSFET.

Each of the first capacitor 303 and the second capacitor 305 may be an example of a smoothing circuit.

The gate driver 390 may control an operation of each of the first to fourth switching elements 330 to 360.

The gate driver 390 may apply an on-signal or an off-signal to each of the first to fourth switching elements 330 to 360 to control a switching operation thereof.

The gate driver 390 may apply a pulse width modulation (PWM) signal to control the switching operation of each of the first to fourth switching elements 330 to 360.

The gate driver 390 may apply the PWM signal to a gate terminal of each of the first to fourth switching elements 330 to 360.

The gate driver 390 may apply the PWM signal to each of the first to fourth switching elements 330 to 360 to control a DC voltage of the DC link. Specifically, the gate driver 290 may increase a magnitude of the DC voltage of the DC link via switching control of each of the first to fourth switching elements 330 to 360.

Next, a circuit configuration of the power conversion device 300 according to an embodiment of the present disclosure is described.

Hereinafter, each of the first to fourth switching elements 330 to 360 may include an IGBT and an anti-parallel diode connected in anti-parallel to the IGBT.

A cathode terminal D11 of the first diode 310 is connected to a positive terminal P of the DC link.

An anode terminal D12 of the first diode 310 is connected to a collector terminal C11 of the first switching element 330 and a collector terminal C33 of the third switching element 350.

An emitter terminal E11 of the first switching element 330 is connected to an AC terminal 301 and a collector terminal C22 of the second switching element 340.

A system may be connected to the AC terminal 301.

An emitter terminal E44 of the fourth switching element 360 and a cathode terminal D21 of the second diode 320 are connected to an emitter terminal E22 of the second switching element 240.

An anode terminal D22 of the second diode 320 is connected to a negative terminal N of the DC link.

An emitter terminal E5 of the third switching element 350 is connected to a neutral point O of the DC link, one end of the first capacitor 303, one end of the second capacitor, and a collector terminal C44 of the fourth switching element 360.

The positive terminal P of the DC link is connected to the other end of the first capacitor 303, while the negative terminal N of the DC link is connected to the other end of the second capacitor 305.

The power conversion device 300 may be connected to the DC link (not shown) via the positive terminal P and the negative terminal N thereof.

When the ANPC-type power conversion device 300 according to an embodiment of FIG. 7 is compared to the ANPC-type power conversion device 200 according to an embodiment of FIG. 2, the ANPC-type power conversion device 300 according to an embodiment of FIG. 7 includes two diodes instead of two switching elements.

That is, according to an embodiment of FIG. 7, two switching elements included in the ANPC-type power conversion device 300 are replaced with two diodes, such that switching loss is reduced, and a manufacturing cost of the power conversion device is reduced.

FIG. 8 to FIG. 11 are diagrams illustrating a direction of current flowing in the power conversion device when controlling voltage of the DC link according to an embodiment of the present disclosure.

In particular, FIG. 8 to FIG. 11 are diagrams illustrating a process in which, in converting AC power to DC power, the same current flow occurs even when each of the first switching element 210 and the fourth switching element 240 of the power conversion device 200 of FIG. 2 is replaced with a diode.

In FIG. 8 to FIG. 11, it is assumed that switching frequencies of the first switching element 330 and the second switching element 340 are the same, while switching frequencies of the third switching element 350 and the fourth switching element 360 are the same.

In FIG. 8 to FIG. 11, an operation of each of the switching elements may be controlled by the gate driver 390.

The gate driver 390 may transmit an on-signal or an off-signal to each of the switching elements in order to control the DC voltage of the DC link.

Figure 8:
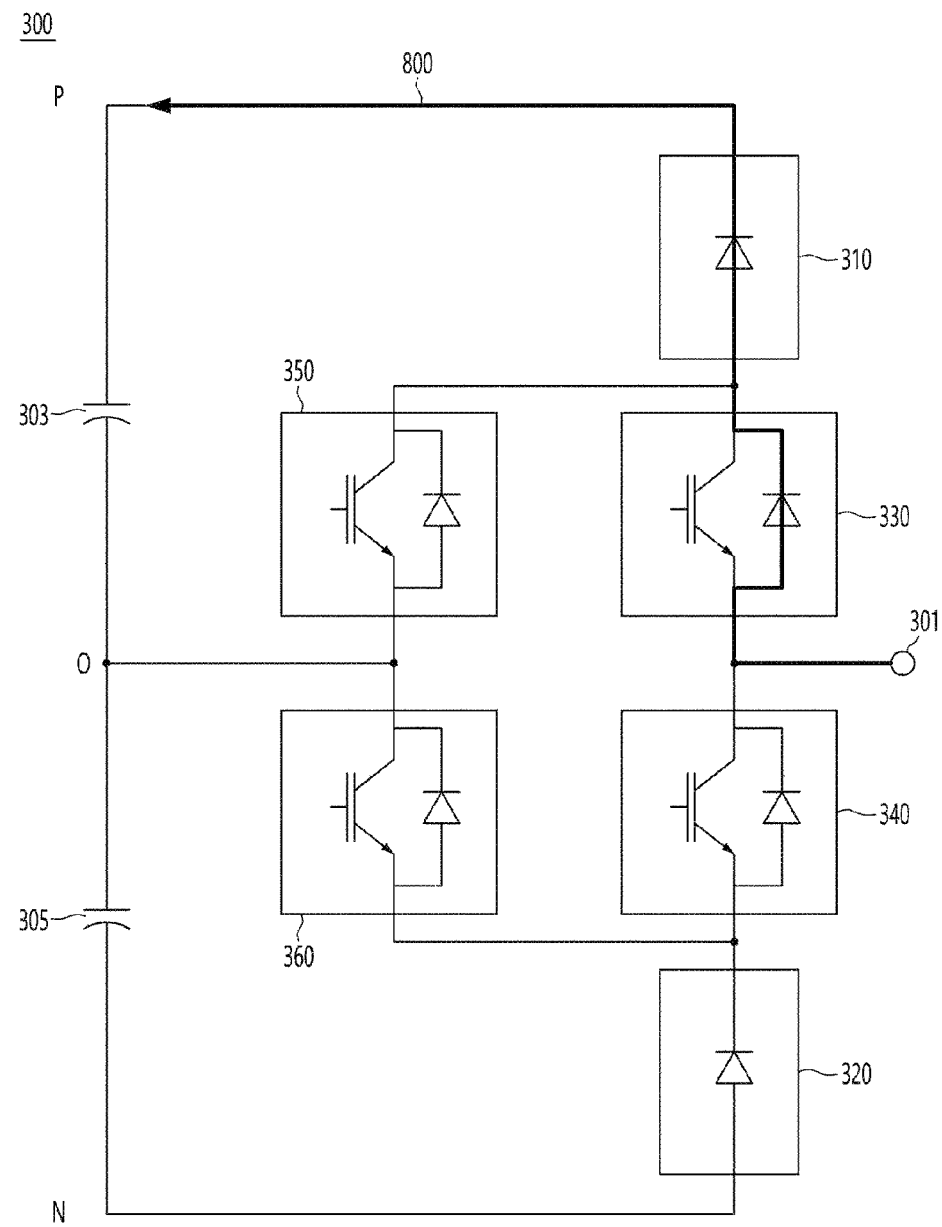
FIG. 8 to FIG. 11 are diagrams illustrating a direction of current flowing in a power conversion device when controlling a voltage of a DC link according to an embodiment of the present disclosure.

First, FIG. 8 is described.

In FIG. 8, it is assumed that each of the first switching element 330 and the fourth switching element 360 is in an on state, while each of the second switching element 340 and the third switching element 350 is in an off state.

In this case, current 800 output from the AC terminal 301 flows through each of a diode of the first switching element 330 and the first diode 310 and flows to the positive terminal P of the DC link.

That is, the first diode 310 allows the current 800 in a forward direction to flow therethrough and then the current flows to the positive terminal P of the DC link.

Figure 9:
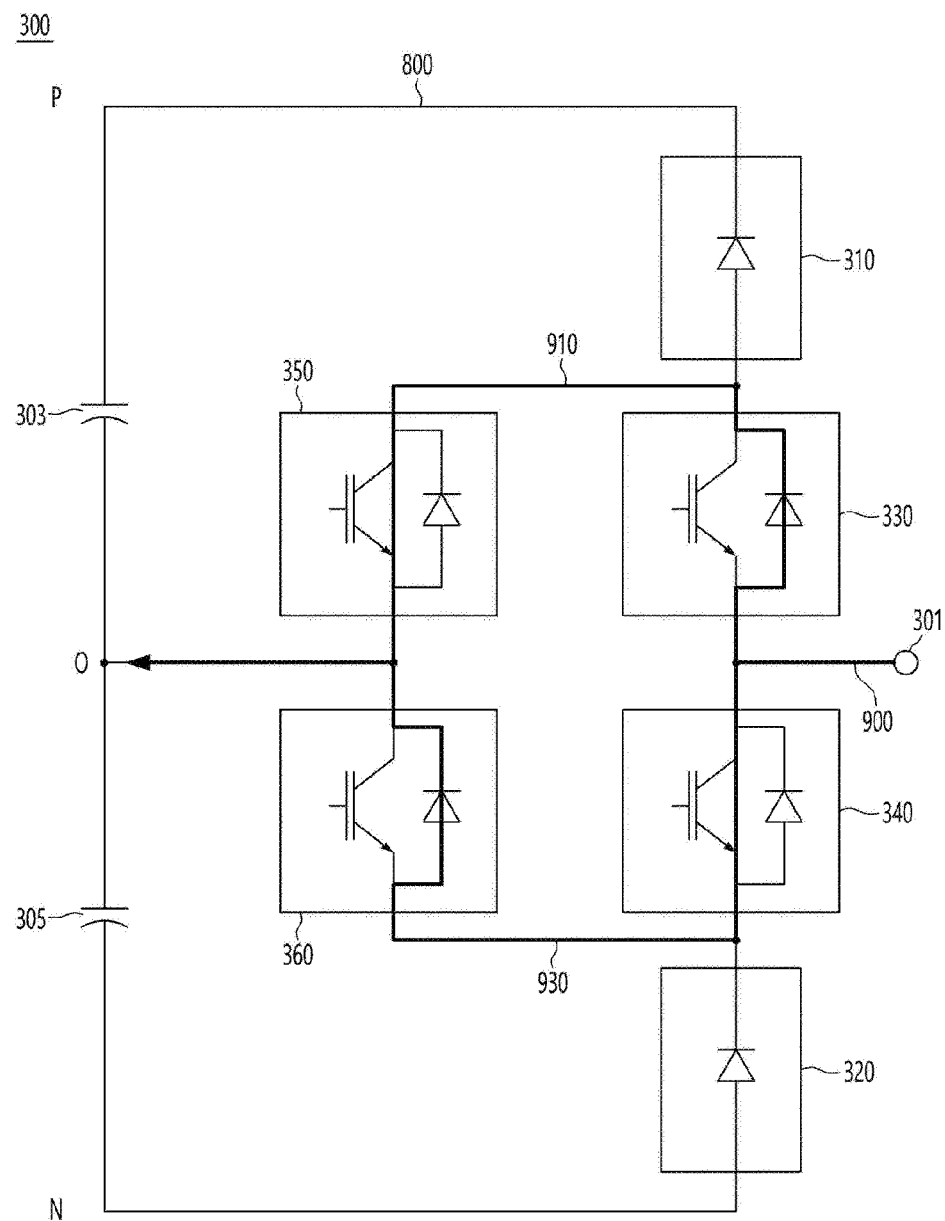

Next, FIG. 9 is described.

In FIG. 9, it is assumed that all of the first to fourth switching elements 330 to 360 are turned on.

In this case, one half 910 of current 900 output from the AC terminal 301 flows through a diode of the first switching element 330 and an IGBT of the third switching element 350 and then to the neutral point O of the DC link.

The other half 930 of the current 900 output from the AC terminal 301 flows through an IGBT of the second switching element 340 and a diode of the fourth switching element 360 and then to the neutral point O of the DC link.

Figure 10:
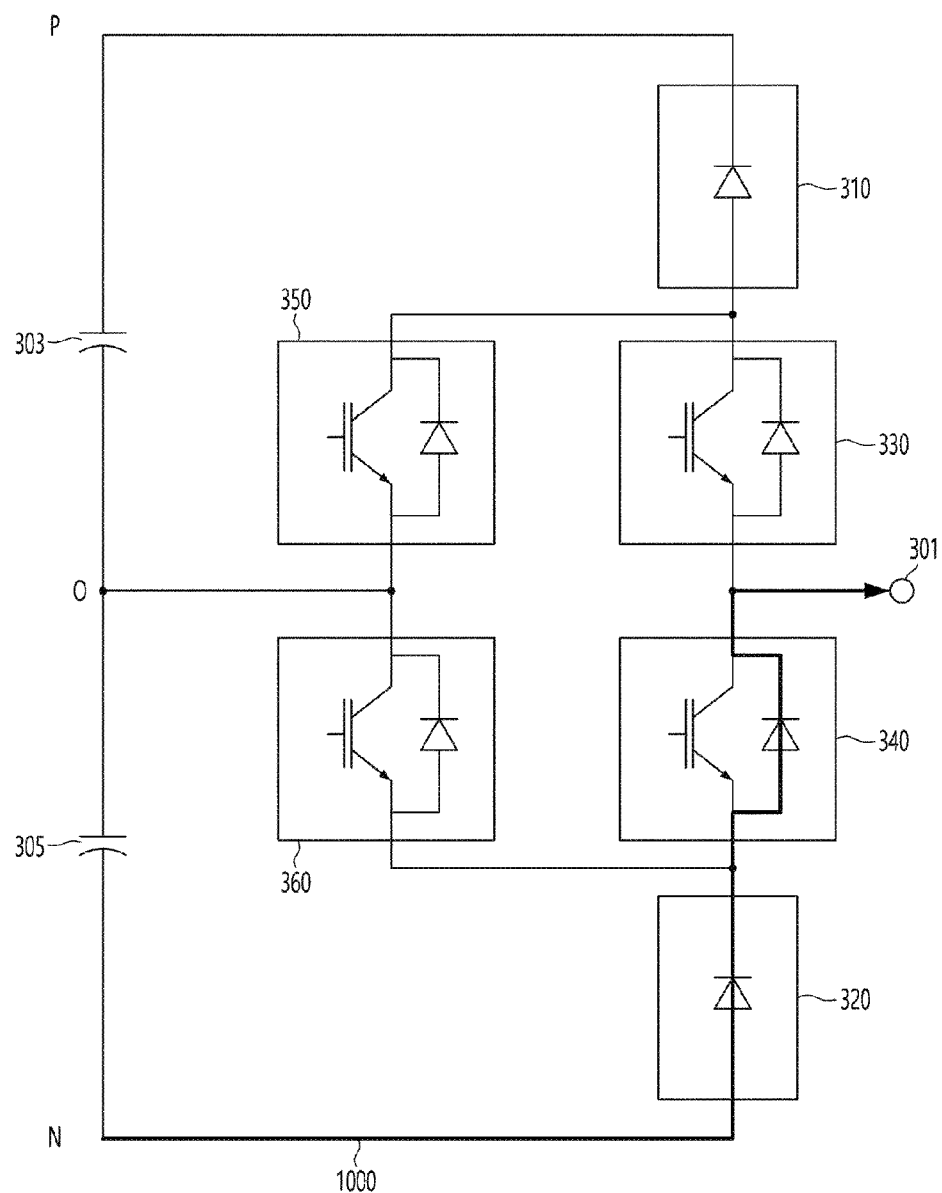

Next, FIG. 10 is described.

In FIG. 10, it is assumed that each of the first switching element 330 and the fourth switching element 360 is in an off state, while each of the second switching element 340 and the third switching element 350 is in an on state.

In this case, current 1000 output from the negative terminal N of the DC link flows through the second diode 320 and a diode of the second switching element 340 and then to the AC terminal 301.

That is, the second diode 320 allows the current 1000 to flow therethrough, and then the current 1000 flows to the AC terminal 301.

Figure 11:
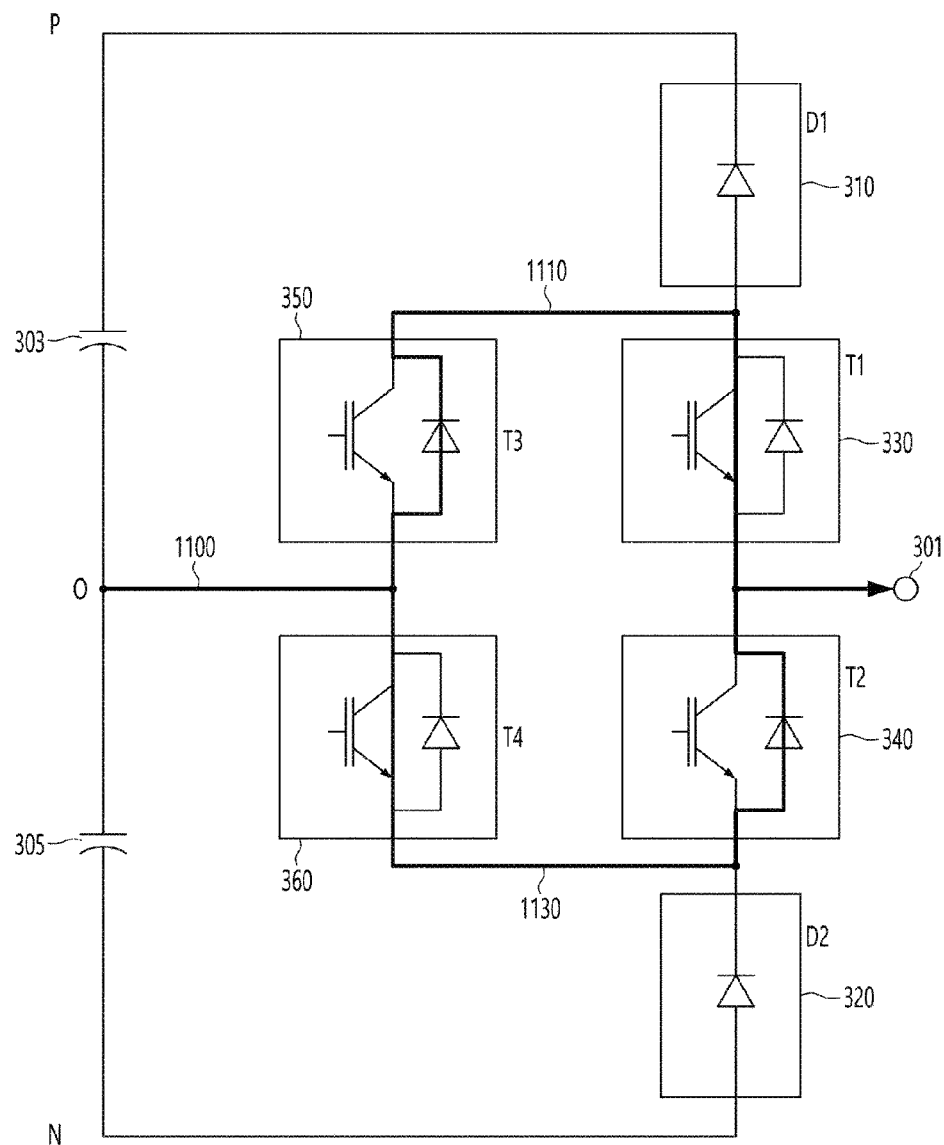

Next, FIG. 11 is described.

In FIG. 11, it is assumed that all of the first to fourth switching elements 330 to 360 are turned on.

In this case, one half 1110 of current 1100 output from the neutral point O of the DC link flows through a diode of the second switching element 350 and an IGBT of the first switching element 330 and then to the AC terminal 301.

The other half 1130 of the current 1100 output from the neutral point O of the DC link flows through an IGBT of the fourth switching element 360 and a diode of the second switching element 340 and then to the AC terminal 301.

When the embodiment of FIG. 3 to FIG. 6 and the embodiment of FIG. 8 to FIG. 11 are compared with each other, it may be identified that there is no change in current flow even when the two switching elements 210 and 240 are replaced with the two diodes 310 and 340.

That is, when the power conversion device 300 according to an embodiment of the present disclosure converts AC power to DC power, the power conversion device 300 uses two diodes instead of two switching elements. Therefore, the switching loss is reduced and the manufacturing cost of the power conversion device is reduced.

Figure 12:
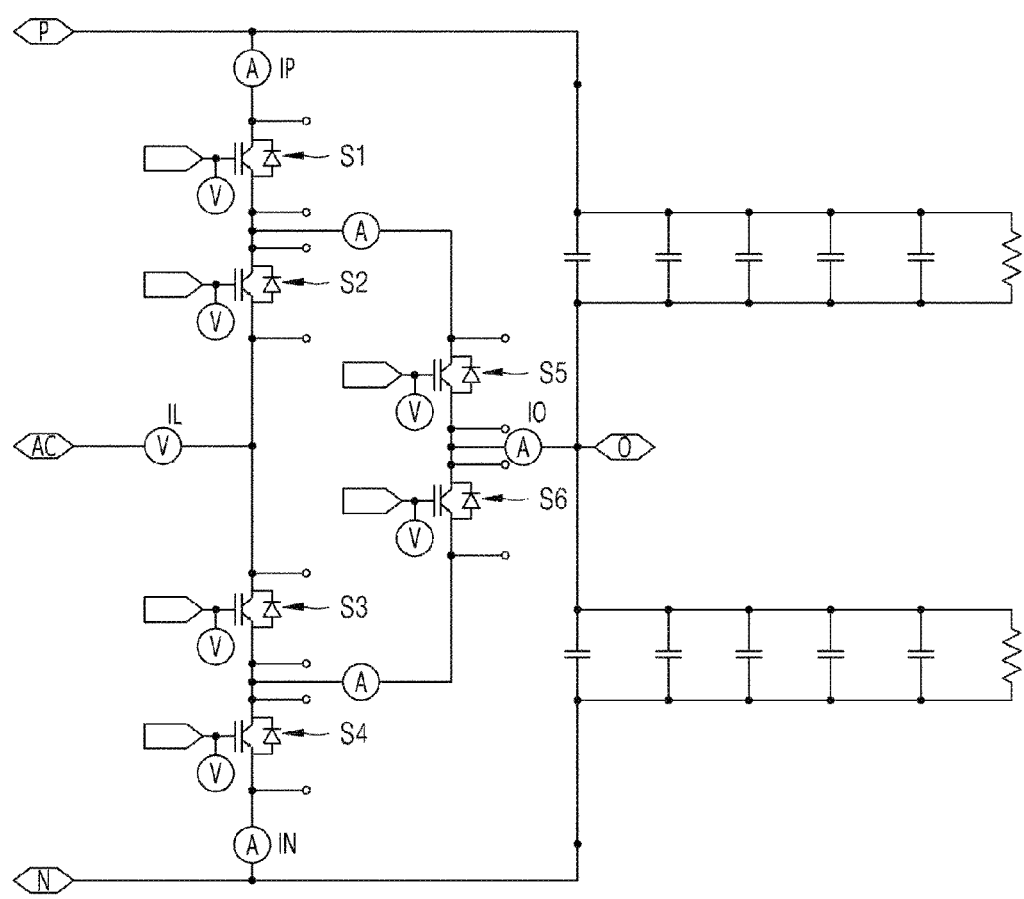
FIG. 12 to FIG. 14 are diagrams illustrating results of simulation on change in current flowing in a power conversion device according to a switching operation of switching elements, under assuming a situation in which two switching elements have been replaced with two diodes.
Figure 13:
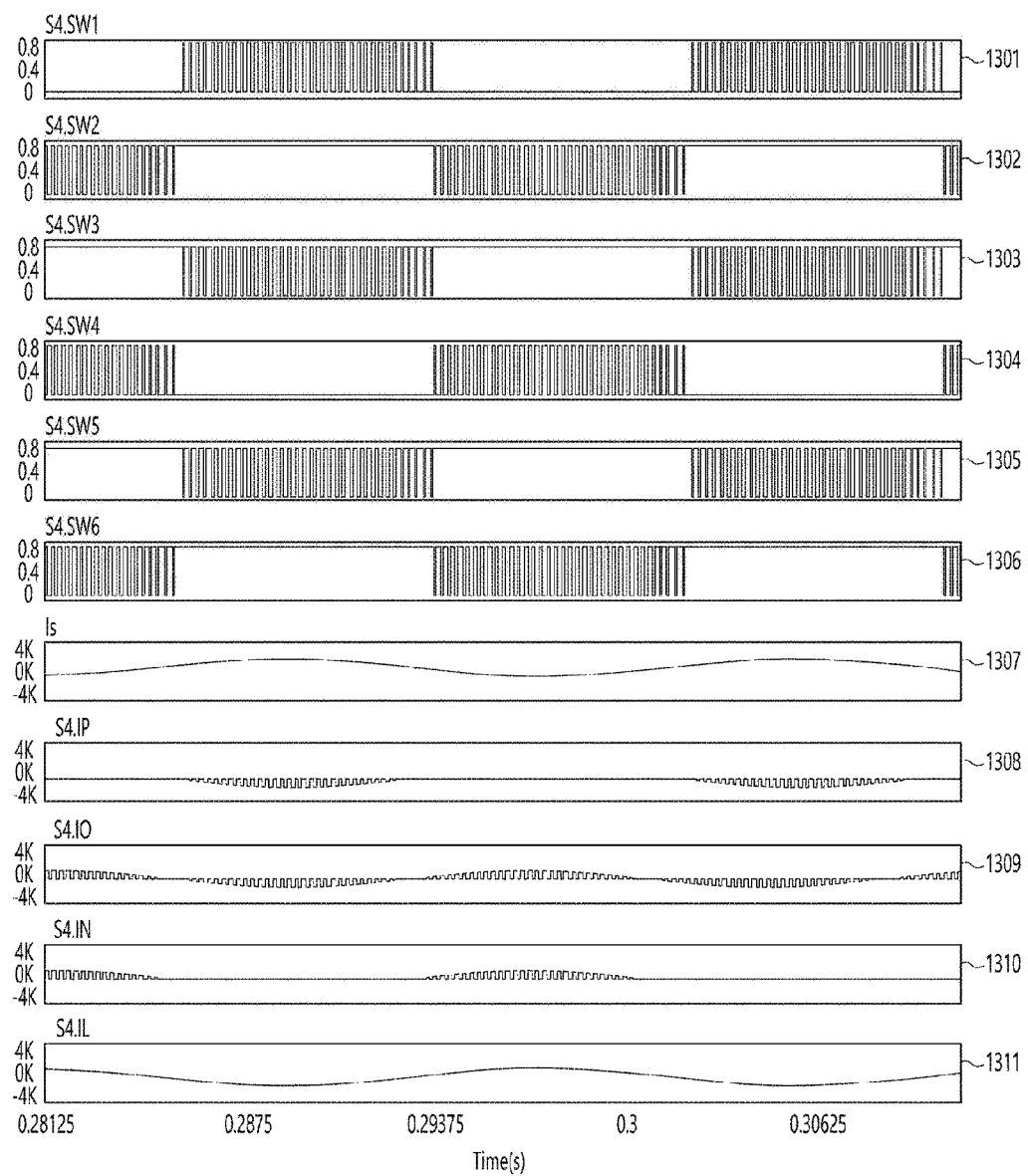
Figures 14, 15:
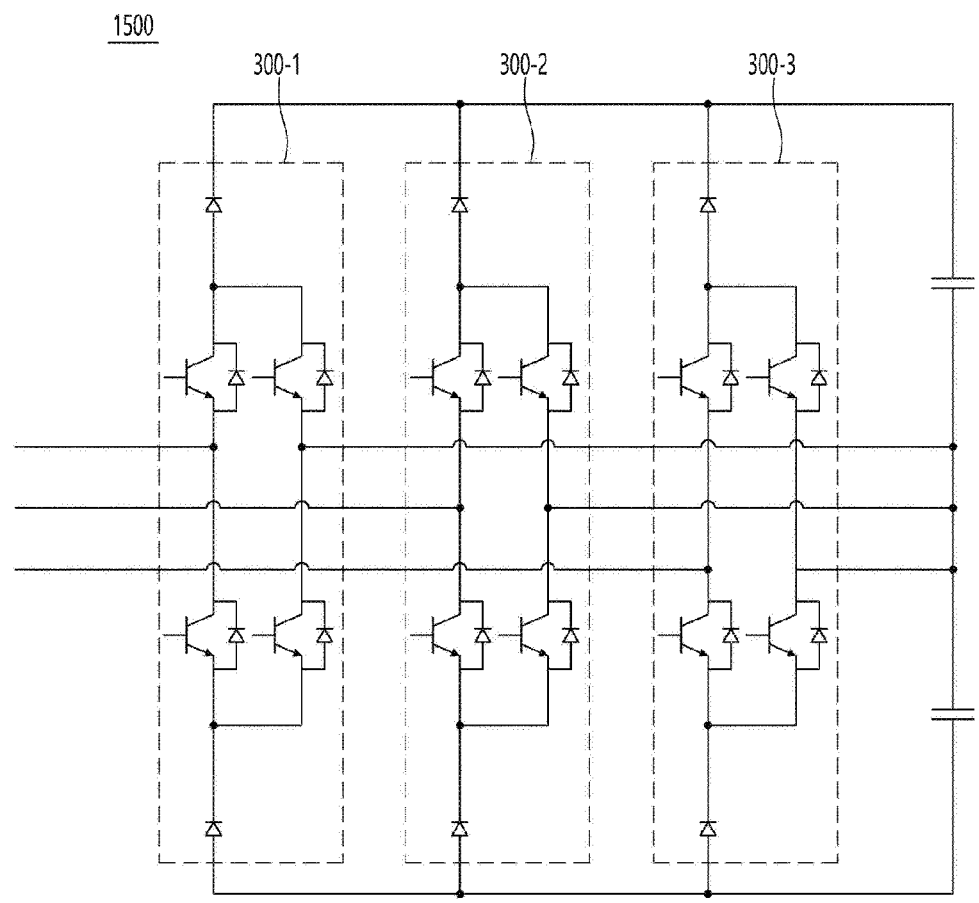
FIG. 15 is a diagram illustrating a configuration of a power conversion system when an ANPC-type power conversion device according to an embodiment of the present disclosure is configured to correspond to each of three phases.

FIG. 12 to FIG. 14 are diagrams illustrating results of simulation on change in current flowing in the power conversion device according to the switching operation of the switching elements, under assuming a situation in which two switching elements are replaced with two diodes.

A simulation condition is as follows.
1. A DC voltage of the DC link controlled from the system is 700V.
2. A system voltage is 440 Vac.
3. A load of the DC link is 1.85 ohms.
4. Power consumed by the load of the DC link is 264 kw.
5. Each of a switching element S1 and a switching element S4 is used as a diode.

FIG. 12 shows a circuit diagram 1200 modeling an ANPC-type power conversion device.

In the circuit diagram 1200 of FIG. 12, the power conversion device includes first to sixth switching elements S1 to S6.

FIG. 13 shows a graph showing on/off states of each of the switching elements in FIG. 12 and a graph showing flow of current in the power conversion device.

A first graph 1301 shows an on/off pattern of the first switching element S1.

A second graph 1302 shows an on/off pattern of the second switching element S2.

A third graph 1303 shows an on/off pattern of the third switching element S3.

A fourth graph 1304 shows an on/off pattern of the fourth switching element S4.

A fifth graph 1305 shows an on/off pattern of the fifth switching element S5.

A sixth graph 1301 shows an on/off pattern of the sixth switching element S6.

A seventh graph 1307 is a graph showing current Is flowing in one phase among the three phases of the system connected to the DC link.

An eighth graph 1301 is a graph representing current IP flowing from the first switching element S1 to the positive terminal P of the DC link.

A ninth graph 139 is a graph showing current Io flowing from the neutral point O of the DC link to the fifth and sixth switching elements S5 and S6.

A tenth graph 1310 is a graph showing current IN flowing from the negative terminal N of the DC link to the fourth switching element S4.

An eleventh graph 1311 is a graph showing current IL flowing through a filter connected to the AC terminal.

FIG. 14 is a table summarizing a current direction according to the simulation of FIG. 12 and FIG. 13.

In FIG. 14, each of "+" and "−" indicates a direction of the current.

+IL means that the current IL flows into the AC terminal 301 in FIG. 7, while −IL means that the current IL flows out of the AC terminal 301.

−I means that the current I flows into the positive terminal P or the negative terminal N of the DC link, while +I means that the current I flows out of the positive terminal P or the negative terminal N of the DC link.

CASE 1 is a result corresponding to an embodiment of FIG. 8, CASE 2 is a result corresponding to an embodiment of FIG. 9, CASE 3 is a result corresponding to an embodiment of FIG. 10, and CASE 4 is a result corresponding to an embodiment of FIG. 11.

Each of the directions of current according to the switching operation as shown in CASE 1 to CASE 4 coincides with each of the directions of current as shown in FIG. 3 to FIG. 6.

This indicates that in the ANPC-type power conversion device, the directions of current when the first switching element S1 and the fourth switching element S4 are used coincide with the result of the simulation in which each of the first switching element S1 and the fourth switching element S4 is replaced with a diode.

That is, even when the power conversion device 300 obtained by replacing each of the first switching element 210 and the fourth switching element 240 with a diode in the conventional power conversion device 200 is used, the same current flow result may be derived.

That is, according to an embodiment of the present disclosure, the diode is used instead of each of two switching elements using an IGBT. Thus, effects of reducing the switching loss and the manufacturing cost may be obtained.

FIG. 15 is a diagram illustrating a configuration of a power conversion system when an ANPC-type power conversion device according to an embodiment of the present disclosure is configured to correspond to each of three phases.

A three-phases power conversion system 1500 may include a first power conversion device 300-1, a second power conversion device 300-2, and a third power conversion device 300-3.

Each of the first power conversion device 300-1, the second power conversion device 300-2, and the third power conversion device 300-3 may have the same configuration as that of the ANPC-type power conversion device 300 as shown in FIG. 7.

The present disclosure has been described above with reference to the drawings. However, the present disclosure is not limited to the embodiments and drawings disclosed herein, and various modifications may be made by those skilled in the art. In addition, even though effects according to a configuration of the present disclosure are not explicitly described while describing the embodiments of the present disclosure, the effects predictable from the configuration should also be recognized.

What is claimed is:

1. A power conversion device for controlling a DC voltage of a DC link, the power conversion device comprising:
   a first diode;
   a second diode;
   a first switching element;
   a second switching element;
   a third switching element; and
   a fourth switching element,
   wherein a cathode terminal of the first diode is connected to a positive terminal of the DC link, and an anode terminal of the first diode is connected to one end of the first switching element and one end of the third switching element,
   wherein the other end of the first switching element is connected to an AC terminal and one end of the second switching element;
   wherein the other end of the second switching element is connected to one end of the second diode and one end of the fourth switching element;
   wherein the other end of the second diode is connected to a negative terminal of the DC link,
   wherein the other end of the third switching element is connected to the other end of the fourth switching element and a neutral point of the DC link.

2. The power conversion device of claim 1, wherein each of the first to fourth switching elements includes an insulated gate bipolar transistor (IGBT), and an anti-parallel diode connected in anti-parallel to the IGBT.

3. The power conversion device of claim 2, further comprising a gate driver for controlling an on or off state of each of the first to fourth switching elements.

4. The power conversion device of claim 3, wherein the gate driver is configured to apply an on-signal to each of the first switching element and the fourth switching element, and apply an off-signal to each of the second switching element and the third switching element such that current output from the AC terminal flows through the diode included in the first switching element and the first diode and then to the positive terminal of the DC link.

5. The power conversion device of claim 3, wherein the gate driver is configured to apply an on-signal to each of the first to fourth switching elements such that one half of current output from the AC terminal flows through the diode of the first switching element and the IGBT of the third switching element and then to the neutral point of the DC link, while the other half of the current output from the AC terminal flows through the IGBT of the second switching element and the diode of the fourth switching element and then to the neutral point of the DC link.

6. The power conversion device of claim 3, wherein the gate driver is configured to apply an off-signal to each of the first switching element and the fourth switching element, and apply an on-signal to each of the second switching element and the third switching element such that current output from the negative terminal of the DC link flows through the second diode and the diode of the second switching element and then to the AC terminal.

7. The power conversion device of claim 3, wherein the gate driver is configured to apply an on-signal to each of the first to fourth switching elements such that one half of current output from the neutral point of the DC link flows through the diode of the second switching element and the IGBT of the first switching element, and then to the AC terminal, while the other half of the current output from the neutral point of the DC link flows through the IGBT of the fourth switching element and the diode of the second switching element and then to the AC terminal.

8. The power conversion device of claim 1, wherein the power conversion device is included in an uninterruptible power supply (UPS),
   wherein the power conversion device is an ANPC (Active Neutral Point Clamped)-type converter for converting AC power to DC power.

9. The power conversion device of claim 1, further comprising:
   a first capacitor disposed between the positive terminal and the neutral point of the DC link; and
   a second capacitor disposed between the neutral point and the negative terminal of the DC link.

10. The power conversion device of claim 1, wherein each of the first to fourth switching elements includes a metal oxide semiconductor field effect transistor (MOSFET), and an anti-parallel diode connected in anti-parallel to the MOSFET.

11. A power conversion device for controlling a DC voltage of a DC link, the power conversion device comprising:
    a first diode;
    a second diode;
    a first switching element;
    a second switching element;
    a third switching element; and
    a fourth switching element,
    wherein each of the first to fourth switching elements includes an insulated gate bipolar transistor (IGBT), and an anti-parallel diode connected in anti-parallel to the IGBT,
    wherein a cathode terminal of the first diode is connected to a positive terminal of the DC link,
    wherein an anode terminal of the first diode is connected to a collector terminal of the first switching element and a collector terminal of the third switching element,
    wherein an emitter terminal of the first switching element is connected to an AC terminal and a collector terminal of the second switching element,
    wherein an emitter terminal of the second switching element is connected to a cathode terminal of the second diode and an emitter terminal of the fourth switching element,
    wherein an anode terminal of the second diode is connected to a negative terminal of the DC link,
    wherein an emitter terminal of the third switching element is connected to a collector terminal of the fourth switching element and a neutral point of the DC link.

12. The power conversion device of claim 11, further comprising a gate driver for controlling an on or off state of each of the first to fourth switching elements.

13. The power conversion device of claim 12, wherein the gate driver is configured to apply an on-signal to each of the first switching element and the fourth switching element and to apply an off-signal to each of the second switching element and the third switching element such that current output from the AC terminal flows through the diode included in the first switching element and the first diode and then to the positive terminal of the DC link.

14. The power conversion device of claim 12, wherein the gate driver is configured to apply an on-signal signal to each of the first to fourth switching elements so that one half of current output from the AC terminal flows through the diode of the first switching element and the IGBT of the third switching element and then to the neutral point of the DC link, while the other half of the current output from the AC terminal flows through the IGBT of the second switching element and the diode of the fourth switching element and then to the neutral point of the DC link.

15. The power conversion device of claim 12, wherein the gate driver is configured to apply an off-signal to each of the first switching element and the fourth switching element, and to apply an on-signal to each of the second switching element and the third switching element such that current output from the negative terminal of the DC link flows through the second diode and the diode of the second switching element and then to the AC terminal.

16. The power conversion device of claim 12, wherein the gate driver is configured to apply an on-signal to each of the first to fourth switching elements so that one half of current output from the neutral point of the DC link flows through the diode of the second switching element and the IGBT of the first switching element and then to the AC terminal, while the other half of the current output from the neutral point of the DC link flows through the IGBT of the fourth switching element and the diode of the second switching element and then to the AC terminal.

17. The power conversion device of claim 11, wherein the power conversion device is included in an uninterruptible power supply (UPS), wherein the power conversion device is an ANPC (Active Neutral Point Clamped)-type converter for converting AC power to DC power.

18. The power conversion device of claim 11, further comprising:

a first capacitor disposed between the positive terminal and the neutral point of the DC link; and a second capacitor disposed between the neutral point and the negative terminal of the DC link.

* * * * *